US011210287B2

(12) United States Patent
Ling et al.

(10) Patent No.: US 11,210,287 B2
(45) Date of Patent: Dec. 28, 2021

(54) SYSTEMS AND METHODS FOR A TITLE QUALITY SCORING FRAMEWORK

(71) Applicant: Walmart Apollo, LLC, Bentonville, AR (US)

(72) Inventors: Bo Ling, Santa Clara, CA (US); Benjamin Matthew Breuner, San Francisco, CA (US); Abon Chaudhuri, Sunnyvale, CA (US); Krishna Chaitanya Yalamanchili, San Jose, CA (US); Abilash Amarthaluri, Fremont, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 30 days.

(21) Appl. No.: 16/777,767

(22) Filed: Jan. 30, 2020

(65) Prior Publication Data
US 2021/0240700 A1 Aug. 5, 2021

(51) Int. Cl.
*G06F 16/242* (2019.01)
*G06F 16/2457* (2019.01)
*G06F 16/2455* (2019.01)
*G06F 16/248* (2019.01)
*G06N 20/10* (2019.01)
*G06Q 30/06* (2012.01)
*G06K 9/62* (2006.01)
(Continued)

(52) U.S. Cl.
CPC .......... *G06F 16/243* (2019.01); *G06F 16/248* (2019.01); *G06F 16/24564* (2019.01); *G06F 16/24578* (2019.01); *G06F 16/30* (2019.01); *G06F 40/226* (2020.01); *G06F 40/30* (2020.01); *G06K 9/6215* (2013.01); *G06N 3/08* (2013.01); *G06N 20/10* (2019.01); *G06Q 30/0625* (2013.01); *G06Q 30/0641* (2013.01)

(58) Field of Classification Search
CPC ........ G06F 40/226; G06F 40/30; G06F 16/30; G06F 16/243
See application file for complete search history.

(56) References Cited

U.S. PATENT DOCUMENTS 6,104,990 A * 8/2000 Chaney ................. G06F 16/313
704/9
8,620,891 B1 * 12/2013 Thirumalai ......... G06F 16/9535
707/705
(Continued)

*Primary Examiner* — Charles E Lu
(74) *Attorney, Agent, or Firm* — Bryan Cave Leighton Paisner LLP

(57) ABSTRACT

A system including one or more processors and one or more non-transitory computer-readable media storing computing instructions configured to run on the one or more processors and perform receiving a title of an item associated with an online catalog; interpreting, using a natural language model, one or more attributes of the predetermined set of attributes; determining a first title quality score for the title based on a first rule; determining a second title quality score for the title based on a second rule; determining an aggregated title quality score for the title based on at least the first title quality score and the second title quality score; generating a content quality list for the title; and sending instructions to display, on a user interface of an electronic device, a content quality dashboard comprising the content quality list for the title of the item. Other embodiments are disclosed.

20 Claims, 8 Drawing Sheets

(51) Int. Cl.
    *G06N 3/08*         (2006.01)
    *G06F 40/30*       (2020.01)
    *G06F 40/226*    (2020.01)
    *G06F 16/30*       (2019.01)

(56) References Cited

U.S. PATENT DOCUMENTS

| | | |
|---|---|---|
| 10,134,072 B2 | 11/2018 | Phillips et al. |
| 10,162,850 B1 * | 12/2018 | Jain ................... G06N 20/20 |
| 2010/0138436 A1 * | 6/2010 | Gupta ................ G06F 16/332 |
| | | 707/759 |
| 2012/0278102 A1 * | 11/2012 | Johnson .............. G06F 40/55 |
| | | 705/3 |
| 2014/0181065 A1 | 6/2014 | Kalyanapasupathy et al. |
| 2014/0258050 A1 * | 9/2014 | Abboud .............. G06Q 10/087 |
| | | 705/28 |
| 2017/0169008 A1 * | 6/2017 | Kang ................... G06F 40/30 |
| 2018/0075323 A1 * | 3/2018 | Kouchnir ............ G06K 9/6268 |

* cited by examiner

| Content Issues ⊙ | | | IMPROVE ATTRIBUTES |
|---|---|---|---|
| ☐ Attributes | Issues | Items with Issues | Impact to Score ↓ |
| ☐ Number of Cust Ratings | 1 Issues | 10,200 | 3.46% |
| ☐ Product Name | 8 Issues | 7,514 | 3.13% |

| Issue | Items with Issues | Impact to Score |
|---|---|---|
| ( Not Capitalized Properly ) | 5,089 | 0.95% |
| ( Missing Key Attributes ) | 2,512 | 1.38% |
| ( Too Long ) | 1,404 | 0.52% |
| ( Not Relevant To The Assigned Product Type ) | 1,028 | 0.10% |
| ( Contains Prohibited Special Characters ) | 519 | 0.02% |
| ( Too Short ) | 172 | 0.05% |
| ( Should Not Be In All Caps ) | 96 | 0.10% |
| ( Contains Prohibited Promotional Phrases ) | 7 | 0.01% |

| ☐ Product Long Description | ( 1 Issues ) | 4,694 | 0.94% |
|---|---|---|---|

FIG. 6

SYSTEMS AND METHODS FOR A TITLE QUALITY SCORING FRAMEWORK

TECHNICAL FIELD

This disclosure relates generally to a title quality scoring framework system.

BACKGROUND

A poor-quality title can impact whether an item is likely to be discovered during a search of a website for such items. Online catalogs often display information for an item using a poor-quality title to describe the item. Conventionally, identifying poor-quality titles was left as a manual review process. Many online catalogs can exceed one hundred million items at any given day. Updating poor-quality titles can be contingent upon one or more title quality rules. Such processes can be time consuming due to the scale of the task and the complexity of computer-processes searching an entire catalog for poor-quality titles for item.

BRIEF DESCRIPTION OF THE DRAWINGS

To facilitate further description of the embodiments, the following drawings are provided in which:

FIG. 6 illustrates an exemplary user interface, according to an embodiment; and

Figure 1:
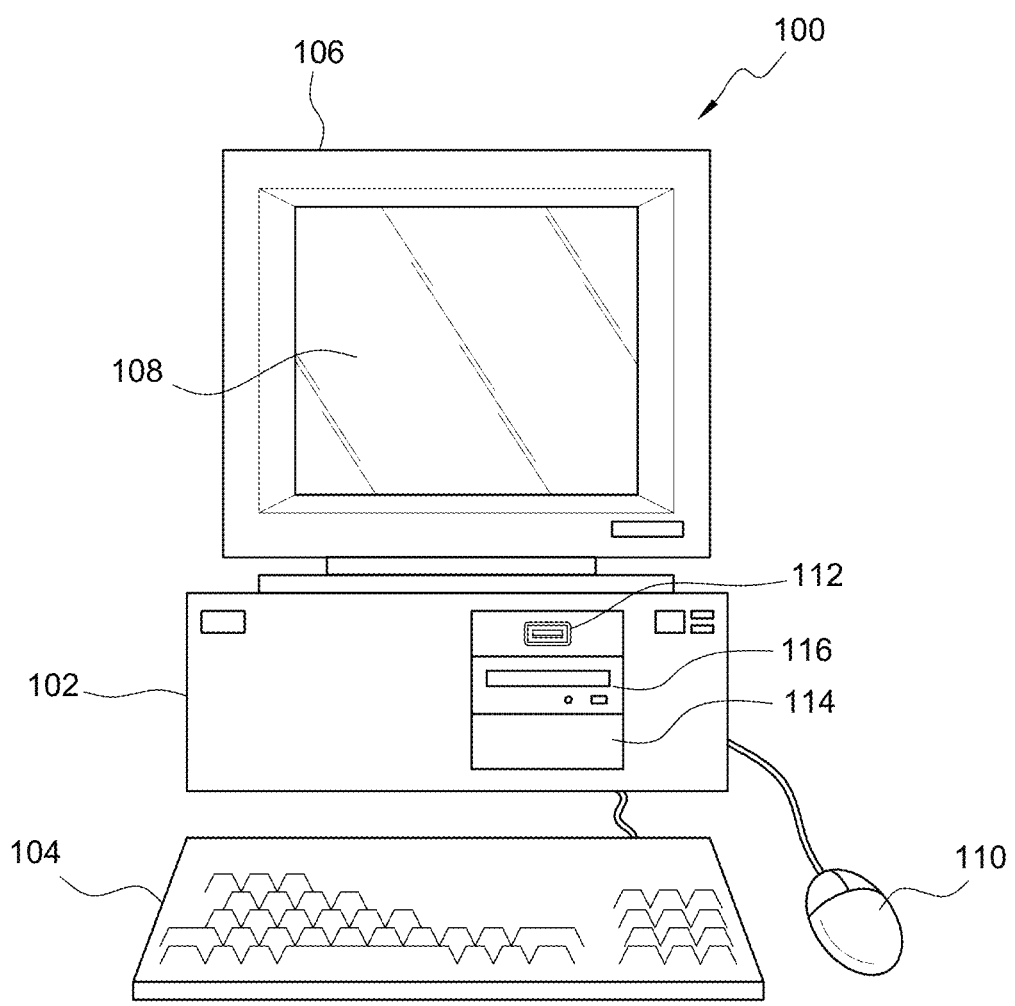
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, or ten seconds.

DESCRIPTION OF EXAMPLES OF EMBODIMENTS

In many embodiments, a quality title scoring framework can provide a technique to employ to identify and score titles of items in an online catalog based one or more rules of scoring a good quality title. In various embodiments, a poor-quality title can reduce the likelihood of discovering an item in an online catalog based on a poor item title description, such as missing attributes in the title. Such a quality title scoring framework can allow retailers to evaluate a content quality list of title scores to improve the content of the title.

Figure 2:
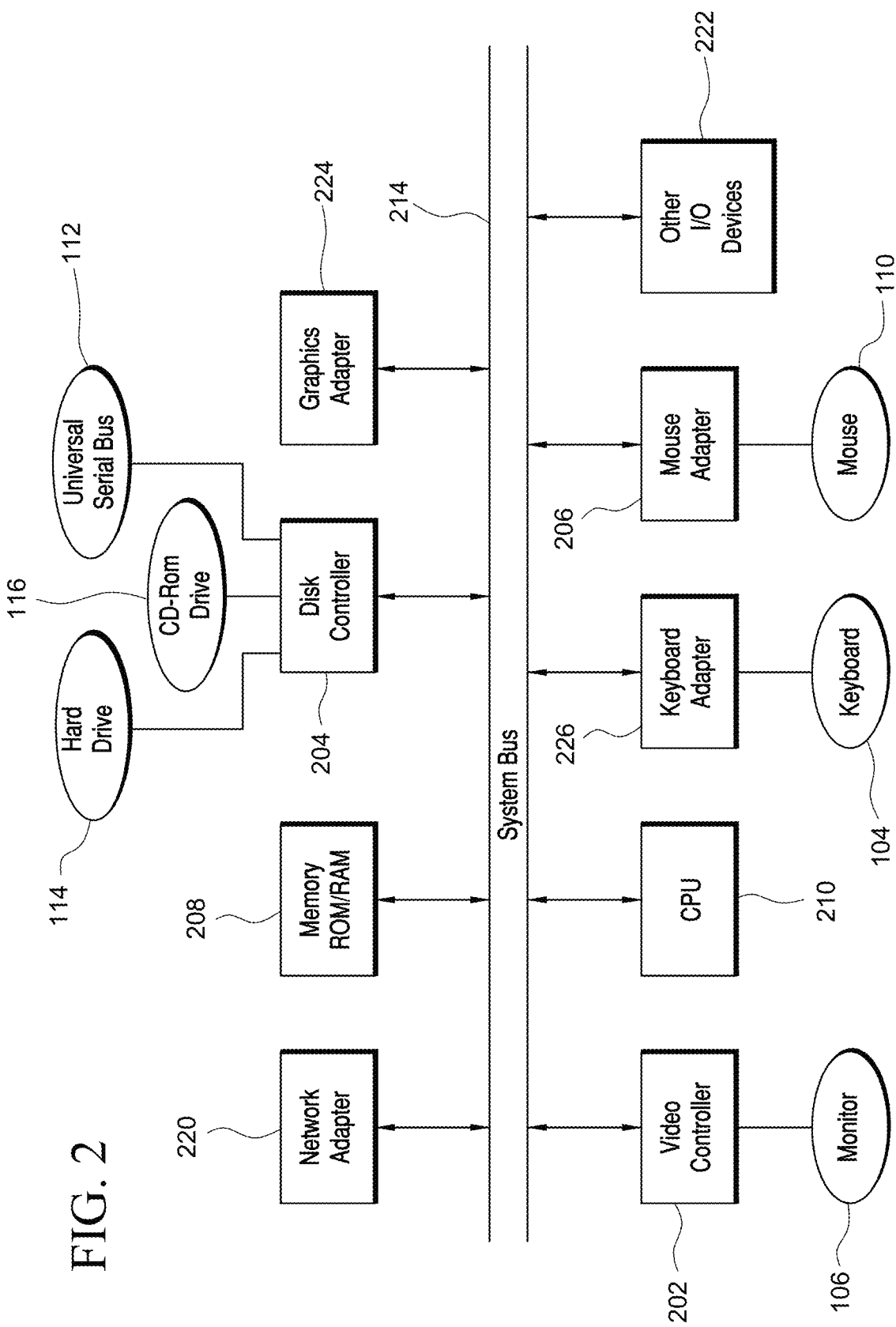
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
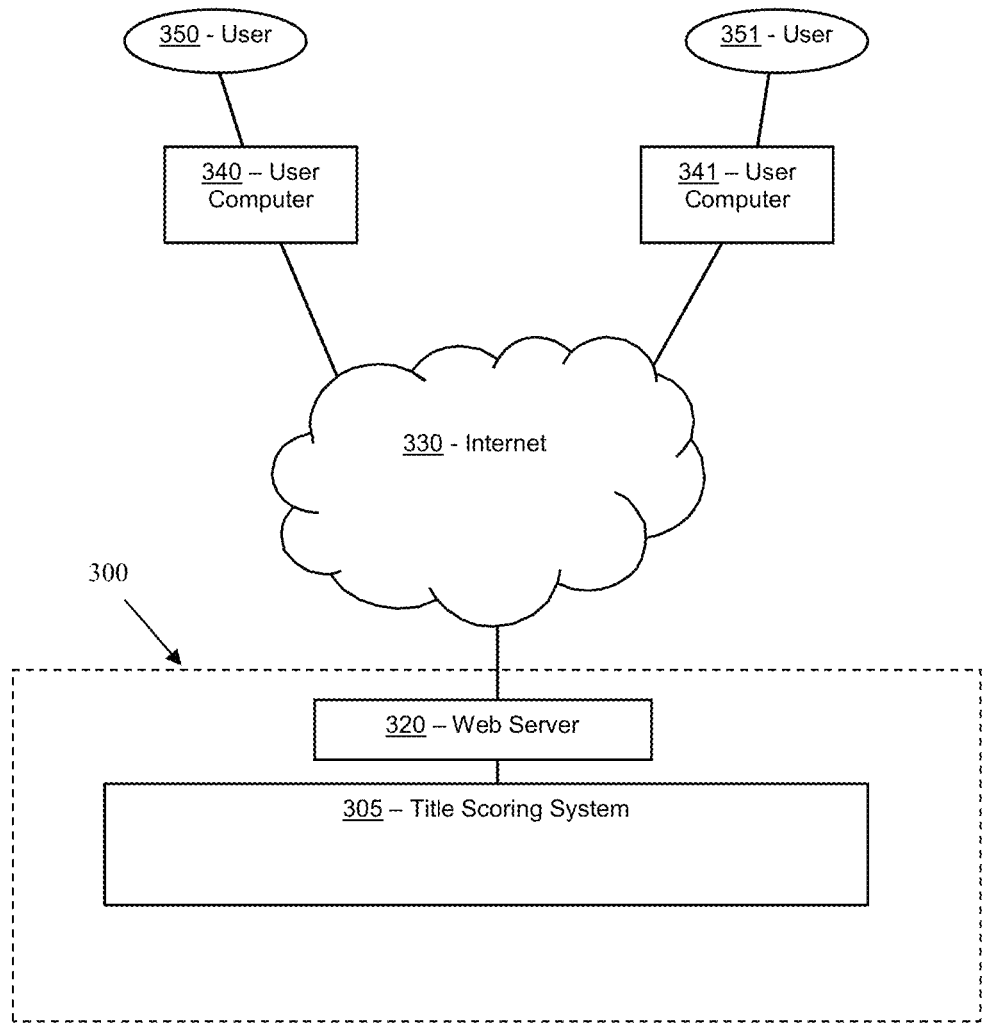
FIG. 3 illustrates a block diagram of a system that can be employed for a title quality scoring framework, according to an embodiment.

Turning ahead in the drawings, FIG. 3 illustrates a block diagram of a system 300 that can be employed for determining a title quality score of a title of an item in a catalog, according to an embodiment. In many embodiments, determining a title quality score can be based on one or more title quality rules. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a title scoring system 305 and/or a web server 320. Title scoring system 305 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, title scoring system 305 and/or web server 320. Additional details regarding title scoring system 305 and/or web server 320 are described herein.

In a number of embodiments, each of title scoring system 305 and/or web server 320 can be a special-purpose computer programed specifically to perform specific functions not associated with a general-purpose computer, as described in greater detail below.

In some embodiments, web server 320 can be in data communication through Internet 330 with one or more user computers, such as user computers 340 and/or 341. Internet 330 can be a public or private network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between title scoring system 305 and/or web server 320 within system 300. Accordingly, in some embodiments, title scoring system 305 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, title scoring system 305 and/or web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to title scoring system 305 and/or web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of title scoring system 305 and/or web server 320. In a similar manner, the processors and/or the non-transitory computer-readable media can be local and/or remote to each other.

Meanwhile, in many embodiments, title scoring system 305 and/or web server 320 also can be configured to communicate with and/or include one or more databases and/or other suitable databases. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between title scoring system 305 and/or web server 320, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, title scoring system 305 can be a general-purpose computer or a special-purpose computer programmed to perform specific functions and/or applications. For example, title scoring system 305 can perform one or more machine learned predictive basket models to determine a set of items to recommend to a user (e.g., 350-351) with a high level of confidence that the user will select all of the items in the set of items. In some embodiments, title scoring system 305 can perform modifying and/or updating a probability of re-ordering each of the items previously ordered by the user. In several embodiments, the probability of re-ordering a set of items, based on one or more machine learned predictive basket models, can be for a specific period of time. In many embodiments, the probability of re-ordering a set of items can depend on whether each item of the set of items exceeds a predetermined threshold and/or a predetermined re-order likelihood score before the item can be included in the set of items for a particular time period. In various embodiments, the set of items to recommend to a user (e.g., 350-351) for a period of time can be modified and/or updated each time the user visits the page (e.g., webpage) and/or automatically updated during another suitable period of time.

Figure 4A:
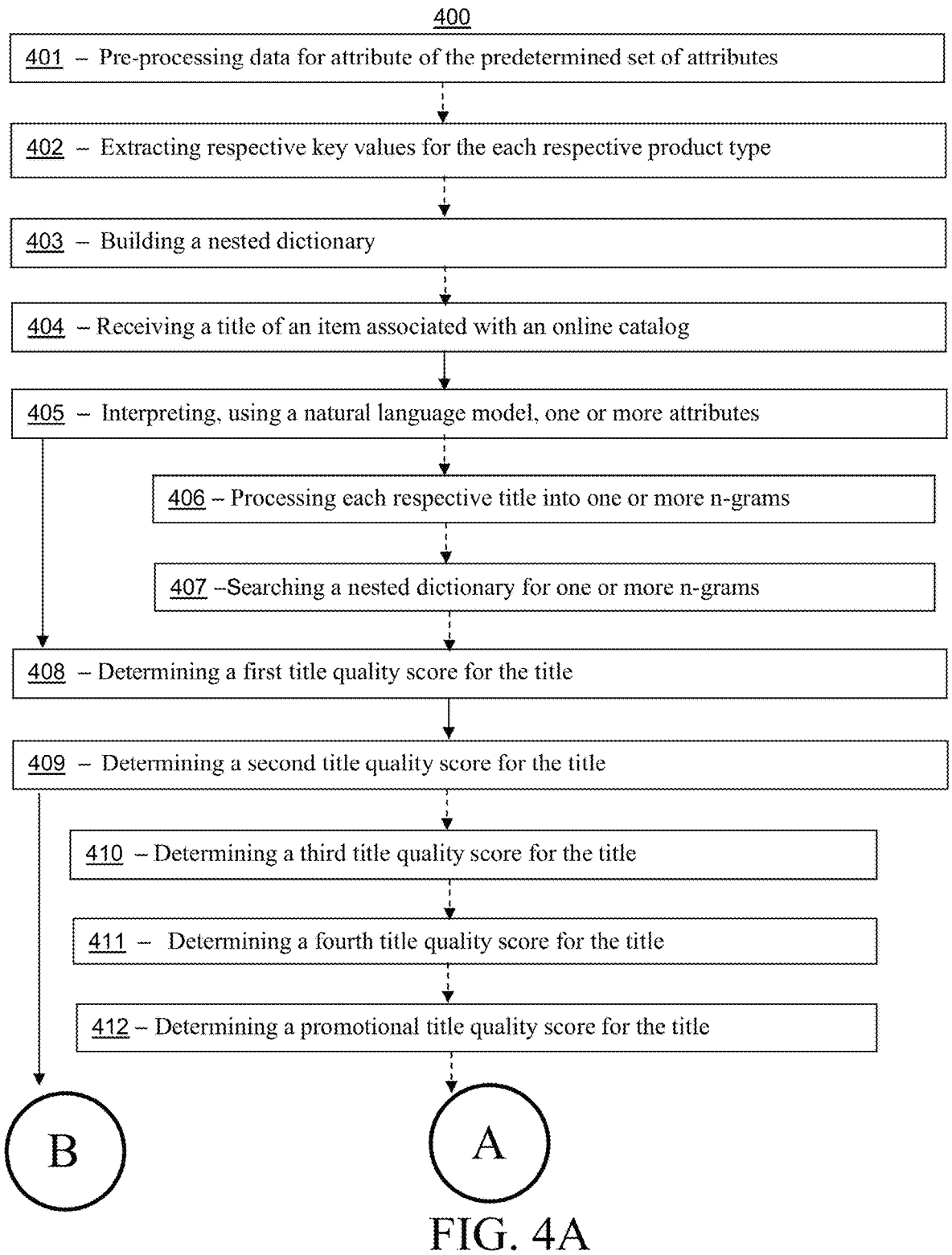
FIGS. 4A-4B illustrates a flow chart for a method, according to another embodiment.
Figure 4B:
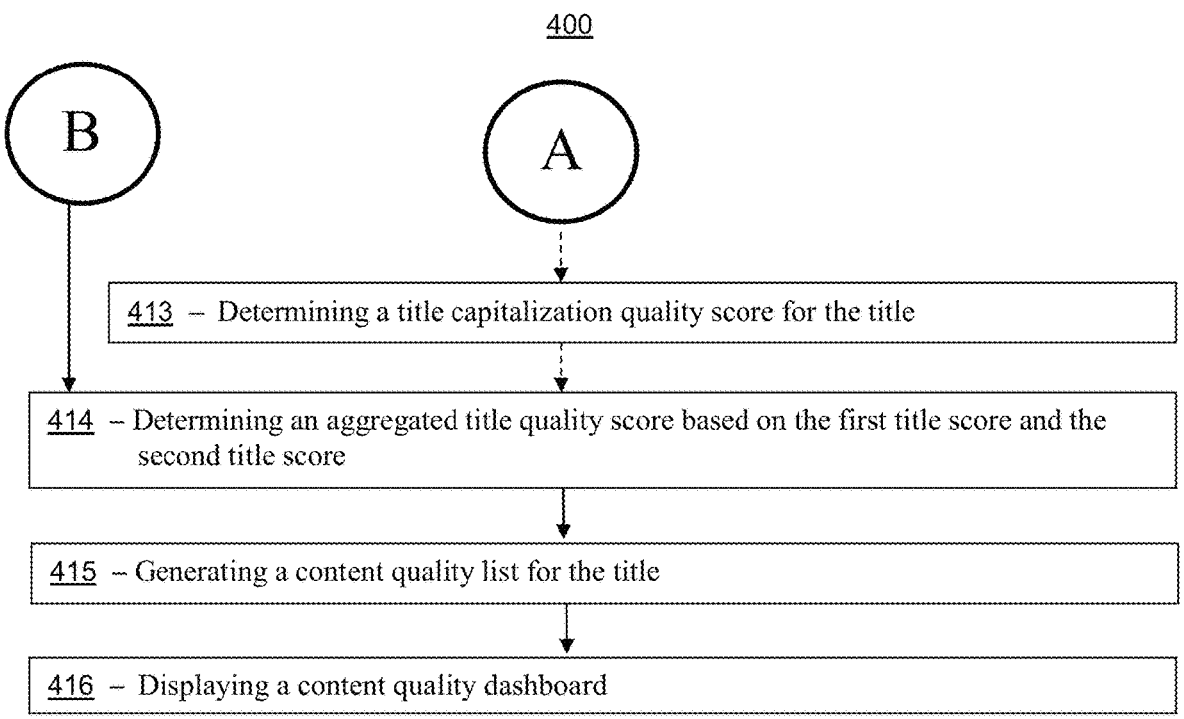

Turning ahead in the drawings, FIGS. 4A-4B illustrates a flow chart for a method 400, according to another embodiment. In some embodiments, method 400 can be a method of determining a title quality score for an item in a catalog, according to another embodiment. In several embodiments, determining a title quality score for an item in a catalog can include presenting a content quality dashboard comprising a content quality list for the title based on the title quality score. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as title scoring system 305 and/or web server 320. The processor(s) can be similar or identical to the processor(s) described above with respect to computer system 100 (FIG. 1).

Referring to FIG. 4A, method 400 can include an optional block 401 of pre-processing data for each respective attribute of a predetermined set of attributes of each respective product type in the online catalog. In many embodiments, determining the key (e.g., important) attributes can include a predetermined set of attributes and values specific to each product type. For example, for two different product types, such as Laptop Computers and T-Shirts, can have two different sets of key attributes and values. For example, a product type of Laptop Computers can include a set of predetermined attributes, such as brand: 0.3, ram memory: 0.15, wireless technology: 0.1, hard drive: 0.1, display technology: 0.1, screen size: 0.1, condition: 0.05, processor type: 0.05, and color: 0.05. In contrast, a product type of T-shirts can include a difference set of predetermined attributes, such as brand: 0.5, size: 0.3, material: 0.1, and color: 0.1.

In a number of embodiments, different product types can have different sets of key attributes and values, as noted above. In many embodiments, different product types can share one or two of the same key attributes. In several attributes, a summation of key attributes for one product type is 1.0 and can be described below:

$$\Sigma_{i \in S_{pt}} a_i = 1.0, \text{ and } \forall a_i \geq 0.0 \qquad \text{Equation (1)}$$

where $S_{pt}$ represents a set of attributes for product type pt, and $a_i$ represents the key attribute of the ith attribute in set $S_{pt}$.

In several embodiments, method 400 can include an optional block 402 of extracting respective key values for the each respective product type. In a number of embodiments, each of the respective key values can include a respective product type, a respective attribute name, and a respective attribute value.

Table 1 below shows an exemplary set of key values for two product types based on a predetermined set of attributes for each product type. In many embodiments, extracting the sets of key values for items can be used in building a nested dictionary, as discussed in further detail in block 403 (FIG. 4A) below.

TABLE 1

A Set of Key Values

| Product type | Attribute name | Attribute value |
| --- | --- | --- |
| Laptop computer | brand | Dell |
| Laptop computer | brand | Apple |
| Laptop computer | color | white |
| T-Shirts | size | small |
| T-Shirts | gender | male |
| T-Shirts | color | pink; black |

In some embodiments, method 400 can include an optional block 403 of building a nested dictionary based on the respective key values, as extracted, for the each respective product type. In many embodiments, the nested dictionary can include attributes of each product type. In some embodiments, the nested dictionary can include (i) lemmatizing each respective word in each of the respective attribute values of the key values and (ii) storing each respective word of the respective attribute values of the key values, as lemmatized, in the nested dictionary database.

In several embodiments, the nested dictionary can include a product type, a normalized attribute value and an attribute name. For example, lemmatizing an attribute value and removing empty spaces between the words can include the attribute value to be transformed from "Golden States Warriors" →"goldenstatewarrior". For a product type Laptop computers, the normalized attribute value "goldenstatewarrior" does not match key attribute names, such as "Laptop computer": "dell": ["brand"], "apple": ["brand", "compatible brand"], "64gb": ["hard disk," "memory", "ram memory"]. For product type T-Shirts the normalized attribute value "goldenstatewarrior" does match key attribute names: "yellow": ["color"], "white": [color], "male": ["color"], "male": ["gender"], "medium": ["size"], "goldenstatewarrior": ["sports team"].

In many embodiments, method 400 can include a block 404 of receiving a title of an item associated with an online catalog. In a number of embodiments, the item can be associated with a product type. In several embodiments, the product type can include a predetermined set of attributes. In some embodiments, the predetermined set of attributes can be located in a key driver attribute list for each product type. In many embodiments, the predetermined set of attributes can be different for each product type.

In various embodiments, method 400 can include a block 405 of interpreting, using a natural language model, one or more attributes of the predetermined set of attributes within the title of the item. In many embodiments, building a natural language model (NLP) to interpret titles can include scanning over 250 million items in the online catalog and extracting the product type, attribute name, and attribute values for each product type of each item. In some embodiments, building the NLP model can include aggregating the key values and counting the number of occurrences of each key value. In many embodiments, filtering the key values can include deleting key values with minimal item count key values.

Table 2 shows an exemplary set of key values and item counts for each product type where the product type T-Shirts with a low item count was deleted as part of the filtering process of gathering the data for the NLP model.

TABLE 2

An Item Count for the Set of Key Values

| Product type | Attribute name | Attribute value | Item count |
|---|---|---|---|
| Laptop computer | brand | Dell | 1000 |
| Laptop computer | brand | Apple | 100 |
| Laptop computer | color | white | 100 |
| T-Shirts | size | small | 8000 |
| T-Shirts | gender | male | 10000 |
| ~~T-Shirts~~ | ~~color~~ | ~~pink, black~~ | ~~2~~ |

In a number of embodiments, method 400 can include an optional block 406 of processing each respective title into one or more n-grams. In several embodiments, building the NLP model can include using an n-gram method for the attributes for each product type. In some embodiments, matching the n-grams of the attributes for each product type can be based on a position and an n-gram size compared with the position of the n-gram in an item title stored in the nested dictionary.

For example, an original title can include "Refurbished Dell Latitude E4310 Laptop Intel Core i5-520m 2.4 GHz 4 GB 320 GB 13.3 in W7Pro" for an item with a product type of Laptop computer. A lemmatized title for the same item can include "refurbished dell latitude e4310 laptop intel core i5 520m 2 4 ghz 4gb 320gb 13 3 in w7pro"

In many embodiments, processing each respective title of an item into one or more n-grams can include using a lemmatized title and concatenated any-gram. Some examples of n-grams to the 5$^{th}$ n-gram for the same title example include:

"unigram": ["refurbished", "dell", "latitude", "e4310", "laptop", "intel", "core", "i5", "520m", "2", "4 ghz", "4gb", "320gb", "13", "3 in", "w7pro"], "bi-gram": ["refurbished dell", "dell latitude", "latitude e4310", "e4310 laptop", "laptop intel", "intel core", "core i5", "i5 520m", "520m 2", "2 4 ghz", "4 ghz 4gb", "4gb 320gb", "320gb 13", "13 3 in", "3 in w7pro"], "tri-gram": ["refurbished dell latitude", "dell latitude e4310", "latitude e4310 laptop", "e4310 laptop intel", "laptop intel core", "intel core i5", "core i5 520m", "i5 520m 2", "520m 2 4 ghz", "2 4 ghz 4gb", "4 ghz 4gb 320gb", "4gb 320gb 13", "320gb 13 3 in", "13 3 in w7pro"], "fourth-gram": ["refurbished dell latitude e4310", "dell latitude e4310 laptop", "latitude e4310 laptop intel", "e4310 laptop intel core", "laptop intel core i5", "intel core i5 520m", "core i5 520m 2", "i5 520m 2 4 ghz", "520m 2 4 ghz 4gb", "2 4 ghz 4gb 320gb", "4 ghz 4gb 320gb 13", "4gb 320gb 13 3 in", "320gb 13 3 in w7pro"], "fifth-gram": ["refurbished dell latitude e4310 laptop", "dell latitude e4310 laptop intel", "latitude e4310 laptop intel core", "e4310 laptop intel core i5", "laptop intel core i5 520m", "intel core i5 520m 2", "core i5 520m 2 4 ghz", "i5 520m 2 4 ghz 4gb", "520m 2 4 ghz 4gb 320gb", "2 4 ghz 4gb 320gb 13", "4 ghz 4gb 320gb 13 3 in", "4gb 320gb 13 3 in w7pro"]

In several embodiments, method 400 can include an optional block 407 of searching a nested dictionary using each combination of the one or more n-grams as a search query to locate the one or more attributes in the title of the item. As noted above, in some embodiments, blocks 406 and/or 407 can be optional activities of method 400. In the same or different embodiments, blocks 406 and/or 407 can be part of block 405.

In some embodiments, method 400 can include a block 408 of determining a first title quality score for the title based on a first rule used to evaluate the one or more attributes of the title. In many embodiments, determining the first title quality score for the title can including assigning the first title quality score for the item based on the aggregated attribute score. In several embodiments, a first rule used to evaluate the one or more attributes of the title can include a requirement that a title must contain key value attributes of the product type in the title. In many embodiments, the first title quality score for the title can be based on the presence of those attributes and applying a weight to the rule based on, for example, the title scoring model including Table 2 and Equation 2 below.

Table 2 below shows a first rule to evaluate the number of attributes in the title of the item, a predetermined weight assigned to the first rule, and a definition. In several embodiments, the weighting of each rule can be applied in the aggregated title quality score based on one or more rules.

TABLE 2

First Rule Attributes

| Rule | Weight | Definition |
|---|---|---|
| Attributes | 40% | Must contain attributes for the product type |

As an example, in many embodiments, generating the attribute score for one item of Laptop Computers can be calculated using:

$$\text{attribute score} \equiv s_1 = \Sigma_{i \in S_{pt}} a_i \cdot I(i \in S_{title}) \quad \text{Equation (2)}$$

where $S_1$ is the attribute score of a title, $S_{title}$ represents a set of existing attributes in the title, $I(i \in S_{title})$ represents the indicator function, which is 1.0 when the ith attribute in the set of $S_{title}$, 0.0 otherwise, $S_{pt}$ represents a set of key attributes for a product type pt, and $a_1$ represents the importance of the ith attribute.

In various embodiments, generating an attribute score can include using the NLP model, the nested dictionary, and/or the n-gram model. In some embodiments, the individual attribute scores in the title can be added together to calculate the first quality score for the title of the item. For example, a final output generated by the NLP model can include a list of attributes found within the title of an item, such as the list of attributes including "condition": "Refurbished", "brand": "DellLatitude", "laptop_computer_type": "Laptop", "processor_type": "Intel Core i5", "wireless_technology": "2.4 GHz", "ram_memory": "4 GB", "hard_drive_capacity": "320 GB", "screen_size": "13.3 in".

In several embodiments, the list of attributes found in title using the NLP model indicates the title can include brand, condition, processor, wireless tech, ram memory, hard drive, and screen size, for a first title quality score calculated as: 0.3+0.05+0.05+0.1+0.15+0.1+0.1=0.85 or 85%.

In many embodiments, method 400 can include a block 409 of determining a second title quality score for the title based on a second rule used to evaluate the one or more attributes of the title. In several embodiments, a second rule used to evaluate the one or more attributes of the title can include a requirement that a title must contain key words relevant to the product type in the title. In many embodiments, each product type can include a set of predetermined keywords. In many embodiments, the second title quality score for the title can be based on the number of those key words in the title and applying a weight to the rule based on, for example, the title scoring model including Table 3 and Equation 3 below.

Table 3 below shows a second rule to evaluate the number of key words in the title of the item, a predetermined weight assigned to the second rule, and a definition. In several embodiments, the weighting of each rule can be applied in the aggregated title quality score based on one or more rules.

TABLE 3

| Second Rule Product Type | | |
|---|---|---|
| Rule | Weight | Definition |
| Product Type | 9% | Must describe the product type |

In several embodiments, determining a second title quality score for the title based on a second rule can include embedding, using a machine learning model, as trained, a product type of the item into a first vector. In some embodiments, embedding, using the machine learning model, as trained, each respective word in the title into one or more second vectors. In various embodiments, determining a similarity score between the first vector and each respective second vector of the one or more second vectors of each respective word in the title. In many embodiments, assigning the second title quality score for the item can be based on a maximum of the similarity score.

In some embodiments, the machine learning model can include a word2vec neural network. In many embodiments, word2vec can be used to embed the product type and each word in the title. In several embodiments, determining the similarity score further can include using a cosine similarity measurement.

In various embodiments, calculating the similarity score between the word embeddings can be performed by:

$$\text{relevance score} \equiv s_2 = \max_{\forall \ word \ \in \ title} \{\cos(\vec{v}_{pt}, \vec{v}_{word})\} \quad \text{Equation (3)}$$

where $\vec{v}_{pt}$ represents the word2vec representation of a product type, $\vec{v}_{word}$ represents the word2vec representation of any word in the title, cos represents a function to calculate the cosine similarity between two vectors, and max is a function to pick the maximum value among the set of values.

In various embodiments, method 400 can include an optional block 410 of determining a third title quality score for the title based on a third rule used to evaluate a length of the title based on the product type. In several embodiments, a third rule used to evaluate the quality of the title can include requirement that a title length cannot be too long or too short. In many embodiments, a length score is predetermined for each product type with a standard deviation. For example, an online catalog can have over 7,000 product types with different requirements for a min/max length for each title of a product type. In several embodiments, building a standard length for each product type can be based on clicked data to indicate a title length for a product type. For example, based on over 13 million clicked data for various product types, the length score with a standard deviation can be calculated. For example, product type Laptop Computers can have an average length of a title of 80 characters with a standard deviation of 20 based on a click data number of 10,000.

A maximum length of a title based on product type can be calculated by:

$$\text{length score} \equiv s_3 = \max\left(0.0, 1.0 - \left|\frac{l - \mu}{2 \cdot \sigma}\right|\right) \quad \text{Equation (4)}$$

where l is the title length, $\mu$ is the average length based on the click data, and $\sigma$ is the standard deviation of the title length of a product type.

In many embodiments, the third title quality score for the title can be based on the length of the characters in the title and applying a weight to the rule based on the title scoring model including Table 4 below and Equation 4 above.

Table 4 below shows a third rule to evaluate the length of characters in the title of the item, a predetermined weight assigned to the third rule, and a definition. In several embodiments, the weighting of each rule can be applied in the aggregated title quality score based on one or more rules.

TABLE 4

| Third Rule Title Length | | |
|---|---|---|
| Rule | Weight | Definition |
| Title Length | 31% | Must be within an average title length for the product type |

In several embodiments, method 400 can include an optional block 411 of determining a fourth title quality score for the title based on a fourth rule used to evaluate an occurrence of prohibited characters within the title based on a predetermined list of prohibited characters. In many embodiments, a fourth rule used to evaluate the quality of the title can include detecting the presence of prohibited (e.g., special characters) in the title, such as $, !, #, @ and/or other suitable prohibited characters. In several embodiments, the list of prohibited characters can be based on a predetermined list of prohibited characters. In many embodiments, the third title quality score for the title can be based on the number of prohibited (e.g., special) characters in the title and applying a weight to the rule based on the title scoring model including Table 5 and Equation 5 below. In several embodiments, any word in the title that includes a prohibited character can be considered to be a bad word, the score can be calculated by:

$$\text{prohibited character score} \equiv S_4 = 1.0 - \frac{\text{number of bad words in title}}{\text{number of total words in title}} \quad \text{Equation (5)}$$

Table 5 shows a fourth rule to evaluate the number of prohibited characters in the title, a predetermined weight assigned to the fourth rule, and a definition. In several embodiments, the weighting of each rule can be applied in the aggregated title quality score based on one or more rules.

TABLE 5

Fourth Rule Special Characters

| Rule | Weight | Definition |
|---|---|---|
| Special characters | 4% | Must not contain special characters |

In some embodiments, method 400 can include an optional block 412 of determining a promotional title quality score for the title based on a promotional rule used to evaluate an occurrence of one or more promotional words within the title. In several embodiments, determining the aggregated title quality score for the title can be based on an additional factor of the promotional title quality score. In many embodiments, the presence of a promotional rule can be determined to be a rule violation with an automatic score of zero. In several embodiments, the list of prohibited promotional words can be a predetermined list of promotional words.

In many embodiments, the promotional title quality score for the title can be based on the presence of any prohibited word in the title and applying a weight to the rule based on the title scoring model including Table 6 below.

Table 6 shows a promotional title rule to evaluate the presence of any promotional words or phrases in the title. No weight is assigned to this rule. In many embodiments, a score of zero applied to the promotional rule can yield a zero for the aggregated title quality score.

TABLE 6

Promotional Rule

| Rule | Weight | Definition |
|---|---|---|
| Promotional phrases | N/A | Must not contain promotional phrases |

In many embodiments, method 400 can include an optional block 413 of determining a title capitalization quality score for the title based on a capitalization rule used to evaluate capitalization of each word in the title. In some embodiments, determining the aggregated title quality score for the title based on an additional factor of the title capitalization quality score. In several embodiments, a title capitalization quality score can be based on a rule requiring the first letter in each word in the title to be capitalized, with limited exceptions for prepositions, articles, conjunctions, acronyms, brands, and other suitable exceptions. In many embodiments, the title capitalization quality score for the title can be based on the number of words in the title without the first letter capitalized and applying a weight to the rule based on the title scoring model including Table 7 and Equation 6 below. In several embodiments, any word in the title that without the first letter capitalized can be considered to be a bad word, the score can be calculated by:

$$\text{capitalization score} \equiv S_{cap} = 1.0 - \frac{\text{number of bad words in title}}{\text{number of total words in title}} \quad \text{Equation (6)}$$

Table 7 shows a capitalization rule to evaluate capitalization of each word in the title, a predetermined weight assigned to the capitalization rule, and a definition. In several embodiments, the weighting of each rule can be applied in the aggregated title quality score based on one or more rules.

Table 7 also shows a rule violation of the capitalization score can include a score of zero when the title is displayed in all capital letters. In many embodiments, the presence of a capitalization violation can be determined to be a rule violation with an automatic score of zero. In many embodiments, the title capitalization quality score for the title can be based on the determination that the title can be displayed in all capital letters.

Table 7 also shows a title capitalization violation to evaluate the presence of any prohibited rule in the title, no weight is assigned to this rule, and a definition. In several embodiments, the weighting of each rule can be applied in the aggregated title quality score based on one or more rules. In many embodiments, a score of zero applied to the capitalization violation can yield a zero for the aggregated title quality score.

TABLE 7

Capitalization Rules and Violations

| Rule | Weight | Definition |
|---|---|---|
| Capitalization Format | 16% | Each letter in the title must be capitalized, subject to exceptions |
| Capitalization violation | N/A | Must not be printed in All caps |

In various embodiments, method 400 can include a block 414 of determining an aggregated title quality score for the title based on at least the first title quality score and the second title quality score. In many embodiments, determining the aggregated title quality score for the title can be based on additional factors of the third title quality score and the fourth title quality score, among others.

In some embodiments, an aggregated title quality score for the title can be based on one or more rules and/or one or more title quality scores. In many embodiments, an aggregated title quality score for the title of an item can be calculated by:

$$\text{Title score} = I_{No\ promotional\ phrases} \cdot I_{No\ all\ caps} \cdot \Sigma_{i=1}^{i=5} \omega_i \cdot S_i$$

where $S_i$ represents the component scores, $\omega_i \in [0.0, 1.0]$, $\Sigma_{i=1}^{i=5} \omega_i = 1.0$ are constraints on the weights of each component score, and $I_{No\ promotional\ phrases}$ and $I_{No\ all\ caps}$ are indicator functions.

In a number of embodiments, method 400 can include a block 415 of generating a content quality list for the title, wherein the content quality list identifies at least one or more content issues based on the aggregated title quality score for the title. In many embodiments, the one or more content issues can include recommendations to correct each quality score for each content issue. In various embodiments, an aggregated score of zero can indicate that title can be sent for corrections without further analysis. In many embodiments, a quality score of zero can indicate the title can be sent for corrections without further analysis.

In several embodiments, method 400 can include a block 416 of sending instructions to display, on a user interface of an electronic device, a content quality dashboard comprising the content quality list for the title of the item.

Figure 5:
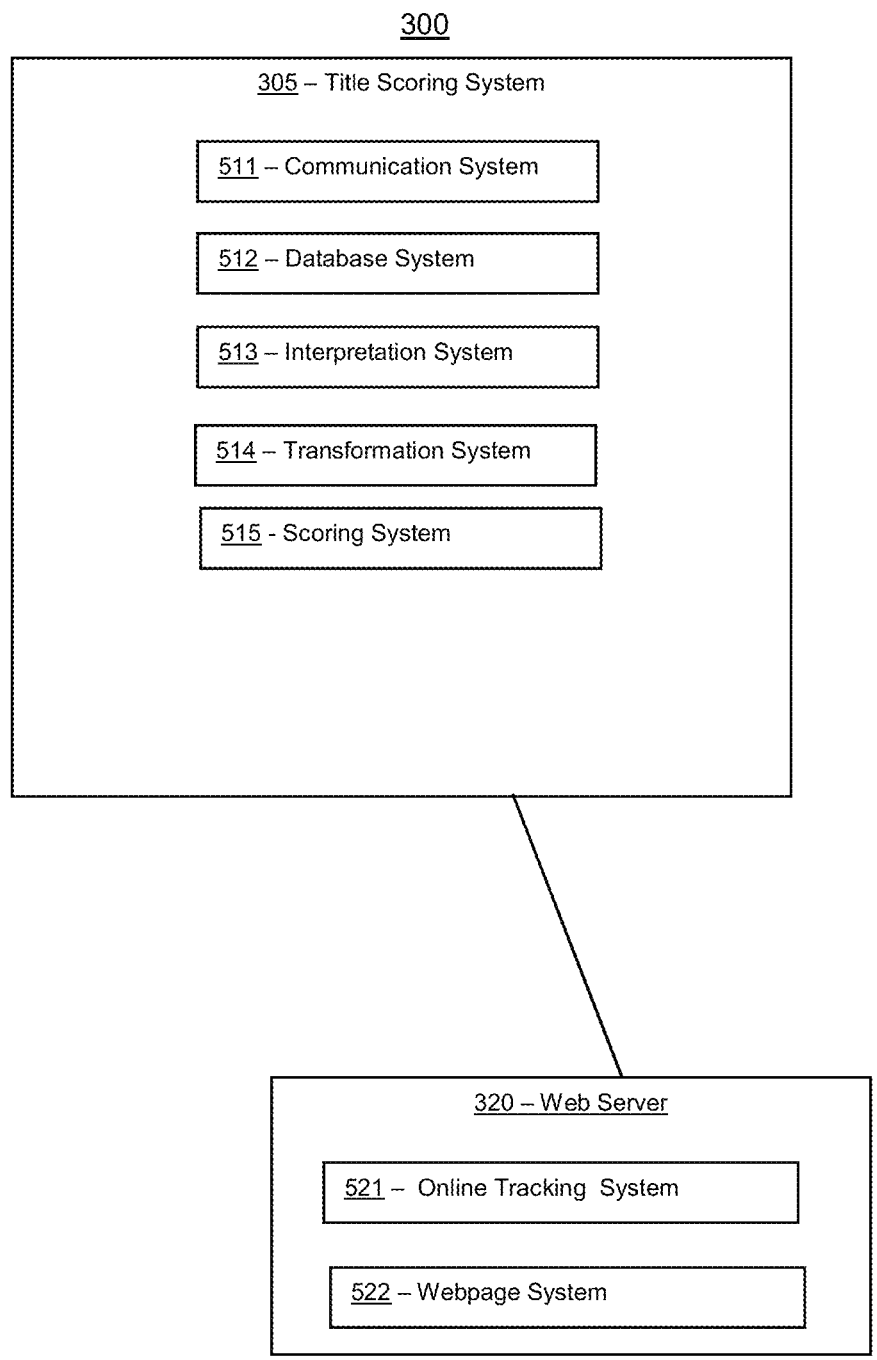
FIG. 5 illustrates a representative block diagram for the system of FIG. 3.

Turning to the next drawing, FIG. 5 illustrates a block diagram of system 300, according to the embodiment shown in FIG. 3. Title scoring system 305 and/or web server 320 are merely exemplary and are not limited to the embodiments presented herein. Title scoring system 305 and/or web server 320 can be employed in many different embodiments or examples not specifically depicted or described herein. In some embodiments, certain elements or systems of title scoring system 305 and/or web server 320 can perform various procedures, processes, and/or acts. In other embodiments, the procedures, processes, and/or acts can be performed by other suitable elements or systems. In many embodiments, the systems of title scoring system 305 and/or web server 320 can be modules of computing instructions (e.g., software modules) stored at non-transitory computer readable media. In other embodiments, the systems of title scoring system 305 and/or web server 320 can be implemented in hardware.

In many embodiments, title scoring system 305 can include a communication system 511. In a number of embodiments, communication system 511 can at least partially perform block 404 (FIG. 4A) of receiving a title of an item associated with an online catalog; and/or block 416 (FIG. 4B) of sending instructions to display, on a user interface of an electronic device, a content quality dashboard comprising the content quality list for the title of the item.

In several embodiments, title scoring system 305 also can include a database system 512. In various embodiments, determination system 512 can at least partially perform block 401 (FIG. 4A) of pre-processing data for each respective attribute of the predetermined set of attributes of each respective product type in the online catalog.

In some embodiments, title scoring system 305 also can include an interpretation system 513. In many embodiments, cart system 513 can at least partially perform block 403 (FIG. 4A) of building the nested dictionary based on the respective key values, as extracted, for the each respective product type, block 405 (FIG. 4A) of interpreting, using a natural language model, one or more attributes of the predetermined set of attributes within the title of the item, block 406 (FIG. 4A) of processing each respective title into one or more n-grams and/or block 407 (FIG. 4A) of searching a nested dictionary using each combination of the one or more n-grams as a search query to locate the one or more attributes in the title of the item.

In some embodiments, title scoring system 305 also can include an interpretation system 514. In many embodiments, cart system 514 can at least partially perform block 401 (FIG. 4A) of pre-processing data for each respective attribute of the predetermined set of attributes of each respective product type in the online catalog and/or block 402 (FIG. 4A) of extracting respective key values for the each respective product type.

In some embodiments, title scoring system 305 also can include an interpretation system 515. In many embodiments, cart system 515 can at least partially perform block 408 (FIG. 4A) of determining a first title quality score for the title based on a first rule used to evaluate the one or more attributes of the title, block 409 (FIG. 4A) of determining a second title quality score for the title based on a second rule used to evaluate the one or more attributes of the title, block 410 (FIG. 4A) of determining a third title quality score for the title based on a third rule used to evaluate a length of the title based on the product type, block 411 (FIG. 4A) of determining a fourth title quality score for the title based on a fourth rule used to evaluate an occurrence of prohibited characters within the title based on a predetermined list of prohibited characters, block 412 (FIG. 4A) of determining a promotional title quality score for the title based on a promotional rule used to evaluate an occurrence of one or more promotional words within the title, block 413 (FIG. 4B) of determining a title capitalization quality score for the title based on a capitalization rule used to evaluate capitalization of each word in the title, block 414 (FIG. 4B) of determining an aggregated title quality score for the title based on at least the first title quality score and the second title quality score and/or block 415 (FIG. 4B) generating a content quality list for the title, wherein the content quality list identifies at least one or more content issues based on the aggregated title quality score for the title.

In a number of embodiments, web server 320 can include an online activity tracking system 521. In many embodiments, online activity tracking system 521 can at least partially perform gathering information regarding online orders that is provided to database system 512.

In several embodiments, web server 320 can include a webpage system 522. Webpage system 522 can at least partially perform sending instructions to user computers (e.g., 350-351 (FIG. 3)) based on information received from communication system 511.

Turning ahead in the drawings, FIG. 6 illustrates an exemplary user interface display 600 showing a webpage of a website. User interface display 600 is merely exemplary, and embodiments of title quality scoring framework for online items can be employed in many different embodiments or examples not specifically depicted or described herein. In several embodiments, user interface display 600 can include a content issue page 601, a title bar 602, a category bar 603, an issue bar 604, a product issue bar 605, a list 606 of one or more rules, and/or a results bar 607. In some embodiments, a title of an item that receives a score that exceeds a predetermined threshold can be evaluated as a good quality title can be not included in the exemplary user interface display 600.

In many embodiments, the data listed in each of columns on the web page, such as the list of issues, items with issues, the impact to score, and/or any other suitable evaluation category, can be used to modify and/or correct the titles of the items selected for an evaluation in an online catalog, a database for the online catalog, and/or any other suitable content media. In several embodiments, the data listed in any of the web pages can be used to share with third parties, such as vendors, retailers, and/or other suitable parties, to implement changes, modifications, and/or any suitable corrective actions using the data and the data results from the evaluations. In various embodiments, the data and/or data results can be used for any other suitable actions for the item, the attributes of the item, the product type and/or any other suitable category of the item.

In many embodiments, content issue page 601 can show a user interface viewed by a user indicating multiple levels of evaluations for a set of items in an online catalog for content issues. In some embodiments, the multiple levels of evaluations can include different levels of multiple evaluation criteria including attributes, number of customer ratings, product name (e.g., title), product long description, and/or other suitable evaluation criteria for items. In several embodiments, each evaluation for each evaluation criteria can be listed in the content issue page, such that some evaluation criteria can be not selected. In many embodiments, the data listed in each of columns on the web page, such as the list of issues, items with issues, the impact to score, and/or any other suitable evaluation category, can be used to modify and/or correct the content issues for the set of items.

In some embodiments, title bar 602 can indicate multiple evaluations of the set of items in an online catalog that relate to content issues.

In several embodiments, category bar 603 can indicate a user interface of an evaluation of a set of items for content issues related to attributes, as shown in a closed status on a webpage.

In various embodiments, issue bar 604 can indicate a user interface of an evaluation of a set of items for content issues related to customer ratings, as shown in a closed status on a webpage.

In a number of embodiments, product issue bar 605 can indicate a user interface of an evaluation of a set of item for content issues related to product name (e.g., item title), as shown in an open status on a webpage.

In many embodiments, list 606 of one or more rules can indicate a list of issues based on the one or more rules that were used in the title quality evaluation of the set of items. In several embodiments, the evaluation for product names scored seven thousand five hundred fourteen (7,514) items based on eight (8) content issues, such as the one or more rules used to generate title quality scores. In several embodiments, the evaluation for product names identified the items with title quality issues and an impact to the title quality score that can lower conversion rates, visibility to users, and/or other suitable impacts for the items.

In several embodiments, results bar 607 can indicate a user interface of an evaluation of a set of items for content issues related to product long description, as shown in a closed status on a webpage.

Figure 7:
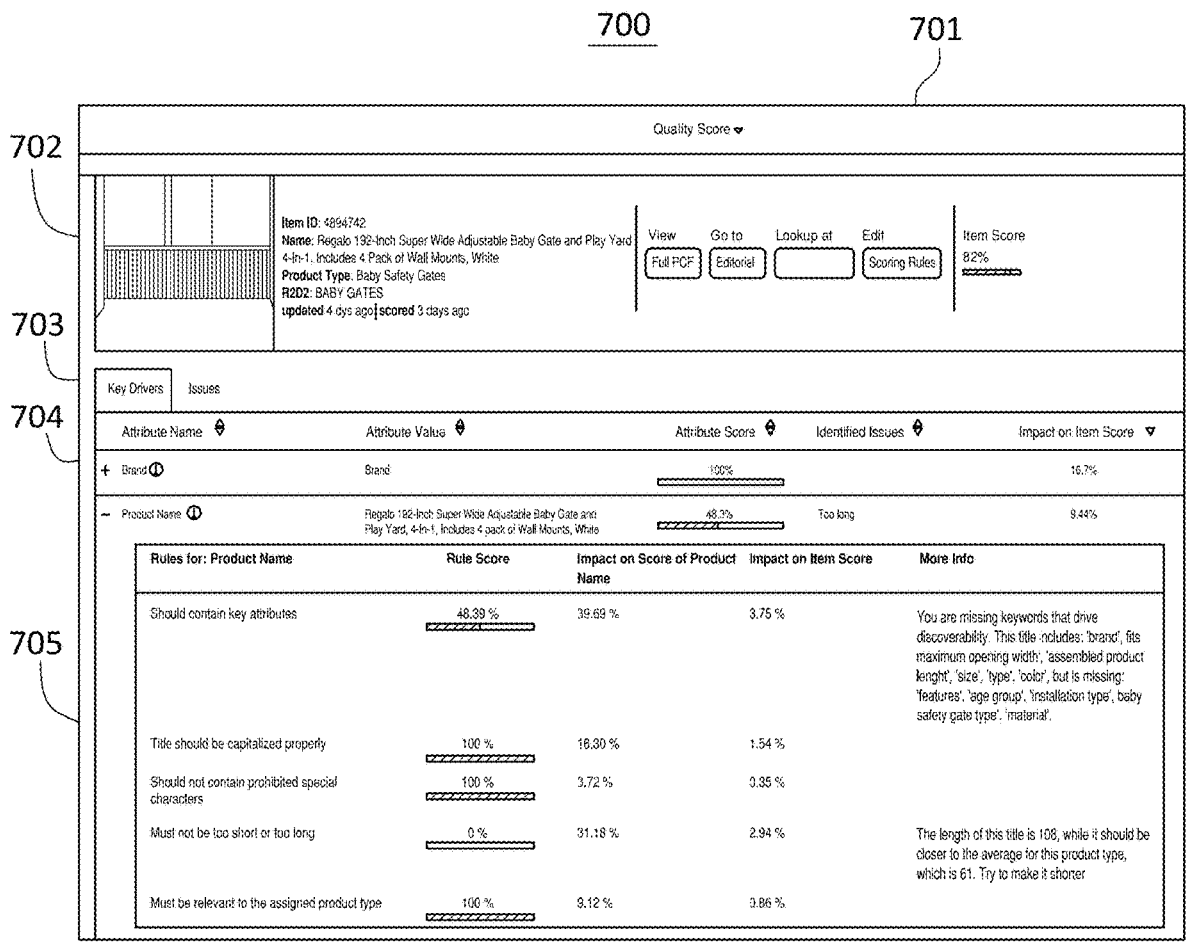
FIG. 7 illustrates an exemplary user interface, according to an embodiment.

Referring to the drawings, FIG. 7 illustrates an exemplary user interface display 700 showing a webpage of a website. User interface display 700 is merely exemplary, and embodiments of title quality scoring framework for online items can be employed in many different embodiments or examples not specifically depicted or described herein. In several embodiments, user interface display 700 can include a content quality dashboard page 701, a product bar 702, a tab bar 703, an issue bar 704, and/or a list 705 of one or more scores for a product.

In some embodiments, a title of an item that receives a score that exceeds a predetermined threshold can be evaluated as a good quality title can be not included in the exemplary user interface display 700. In several embodiments, a title of an item that receives an aggregated title quality score of zero can be not included in the content quality dashboard. In several embodiments, a title of an item that receives an aggregated title quality score of zero can be flagged for corrections, modifications, and/or other suitable actions. In many embodiments, a title of an item that receives a quality title score of zero from execution of the one or more rules can be flagged for corrections, modifications, and/or other suitable actions.

In many embodiments, the data listed in the web page can be used to modify and/or correct the titles of the item, such data and/or data analysis can include a list of issues, rule score, impact on rule score of product name, impact on item score, analysis (e.g., more info, results, recommendations) and/or any other suitable evaluation category. In many embodiments, the data listed in the web page also can be used to modify and/or correct the titles of the items in an online catalog, a database for the online catalog, and/or any other suitable content media. In several embodiments, the data listed in the webpage can be used to share with third parties, such as vendors, other retailers, and/or other suitable parties, to implement changes, modifications, and/or any suitable corrective actions using the data and/or the analysis from the evaluations. In various embodiments, the data and/or analysis can be used for any other suitable action for the item, product type, attributes and/or any other suitable category.

In many embodiments, content quality dashboard page 701 can show a user interface of a webpage on a website displayed to a user including data and analysis presented (e.g., published) after execution of the title quality scoring framework of the title of an item.

In several embodiments, product bar 702 can show a user interface of a webpage indicating the subject of the evaluation for title quality, such as "Regalo 192-inch Super Wide Adjustable Baby Gate and Play Yeard, 4-in-1, includes 4 Pack of Wall Mounts, White." In many embodiments, the aggregated title quality score for a title can be a range between 0 and 1, such as the aggregated title quality score of 82% for the item. In some embodiments, the aggregated title quality score can exceed a predetermined threshold can indicate a good quality title for the item, product type, attributes, and/or any other suitable category for the item. In a number of embodiments, the aggregated title quality score can fall below a predetermined threshold can indicate a poor quality title for the item, product type, attributes, and/or any other suitable category for the item. In several embodiments, a determination of a poor quality title can indicate the item can be flagged for corrective action, modification, and/or another suitable action.

In various embodiments, tab bar 703 can indicate the presence of one or more webpages that can be found on the present webpage that can include the key drivers for this product type "Baby Safety Gates", the issues (e.g., content issues such as shown in display 600), and/or any other suitable webpages. In many embodiments, the predetermined list of most relevant product attributes for the product type Baby Safety Gates can be included in the key drivers web page (e.g., tab), shown in a closed status on the user interface of the webpage.

In some embodiments, issue bar 704 can indicate other web pages of the current webpage, shown in a closed status on the webpage. In many embodiments, the data in the other pages can be related to the item. In some embodiments, the data in the other pages can be related to other suitable content media.

In a number of embodiments, list 705 can show data and/or analysis of one or more title quality scores based on the one or more rules used in the title quality scoring framework for an item. In many embodiments, the aggregated title quality score can be based on one or more of the individual title quality scores. In various embodiments, data and data results listed on the user interface can include multiple evaluations of the title of an item based on the one or more rules used in the title quality score framework. In some embodiments, the content quality dashboard page can list the content quality list for the title of the item with analysis of each of the quality title scores. In many embodiments, the analysis of each of the quality title scores can include recommendations, corrections, and/or any other suitable criteria related to improvements for a good quality title of the item. In several embodiments, the evaluation data and/or the results of the evaluation data can be stored in a database.

Conventionally, title quality scoring was implemented using a manual process and/or not detected. The title quality scoring framework can provide an improvement over the previous method by determining a quality title score based on one or more rules. Such a title quality score for each item in a catalog can evaluate the quality of each title of an item, assess a title quality score, identify specific quality issues, and/or provide item specific recommendations to correct the content issues in an online catalog. A title quality scoring framework provides an improvement over the conventional process of scoring titles of item for quality.

In many embodiments, the techniques described herein can be used continuously at a scale that cannot be handled using manual techniques. For example, the number of daily and/or monthly visits to a website can exceed approximately ten million and/or other suitable numbers, and/or the number of products and/or items sold on the website can exceed approximately ten million (10,000,000) approximately each day. In many embodiments, the set of titles of multiple items can include items selected from an online catalog. In various embodiments, the online catalog for a retailer can exceed approximately eighty million items (80,000,000) on any given day and the number of product types can exceed 7,000 on a given day.

In a number of embodiments, the techniques described herein can use a machine learning model that arises only within the realm of computer networks, as determining whether a title of an item is a poor quality title based on one or more rules does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because an online catalog that can power and/or feed an online website that is part of the techniques described herein would not exist.

Various embodiments include a system. The system can include one or more processors and one or more non-transitory computer-readable media storing computing instructions configured to run on the one or more processors and perform certain acts. The acts can include receiving a title of an item associated with an online catalog. The item can be associated with a product type. The product type can include a predetermined set of attributes. The acts also can include interpreting, using a natural language model, one or more attributes of the predetermined set of attributes within the title of the item. The acts further can include determining a first title quality score for the title based on a first rule used to evaluate the one or more attributes of the title. The acts additionally can include determining a second title quality score for the title based on a second rule used to evaluate the one or more attributes of the title. The acts also can include determining an aggregated title quality score for the title based on at least the first title quality score and the second title quality score. The acts further can include generating a content quality list for the title. The content quality list can identify at least one or more content issues based on the aggregated title quality score for the title. The acts also can include sending instructions to display, on a user interface of an electronic device, a content quality dashboard comprising the content quality list for the title of the item.

Several embodiments include a method. The method of claim can be implemented via execution of computing instructions configured to run at one or more processors and stored at one or more non-transitory computer-readable media. The method can include receiving a title of an item associated with an online catalog. The item can be associated with a product type. The product type can include a predetermined set of attributes. The method also can include interpreting, using a natural language model, one or more attributes of the predetermined set of attributes within the title of the item. The method further can include determining a first title quality score for the title based on a first rule used to evaluate the one or more attributes of the title. The method additionally can include determining a second title quality score for the title based on a second rule used to evaluate the one or more attributes of the title. The method also can include determining an aggregated title quality score for the title based on at least the first title quality score and the second title quality score. The method further can include generating a content quality list for the title, wherein the content quality list identifies at least one or more content issues based on the aggregated title quality score for the title. The method also can include sending instructions to display, on a user interface, a content quality dashboard comprising the content quality list for the item.

Although automatically determining a title quality score for a title of an item in a catalog has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 3-8 may include different procedures, processes, and/or activities and be performed by many different modules, in many different orders, and/or one or more of the procedures, processes, or activities of FIGS. 3-8 may include one or more of the procedures, processes, or activities of another different one of FIGS. 3-8. As another example, the systems within title scoring system 305 and/or webserver 320 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed:

1. A system comprising:
one or more processors; and
one or more non-transitory computer-readable media storing computing instructions configured to run on the one or more processors and perform:
receiving a title of an item associated with an online catalog, wherein:
the item is associated with a product type; and
the product type comprises a predetermined set of attributes;
interpreting, using a natural language model, one or more attributes of the predetermined set of attributes of the product type within the title of the item;
determining a first title quality score for the title based on a first rule used to evaluate key value attributes of the one or more attributes of the title, wherein the first rule comprises a condition for a quantity of key value attributes in the title based on the product type;
determining a second title quality score for the title by:
embedding, using a neural network model, first data of the product type of the item into a first vector;
embedding, using the neural network model, respective second data of each respective word in the title of the item into a respective second vector; and
determining a respective similarity score between the first vector and the respective second vector for the each respective word in the title;
determining an aggregated title quality score for the title based on at least the first title quality score and the second title quality score, using a respective predetermined weight assigned to each of (i) the first title quality score and (ii) the second title quality score;
generating a content quality list for the title, wherein the content quality list identifies at least one or more content issues based on the aggregated title quality score for the title; and
sending instructions to display, on a user interface of an electronic device, a content quality dashboard comprising the content quality list for the title of the item, the first title quality score, and the second title quality score.

2. The system of claim 1, wherein:
the computing instructions are further configured to run on the one or more processors and perform:
pre-processing data for each respective attribute of the predetermined set of attributes of each respective product type in the online catalog; and
extracting respective key values for the each respective product type, wherein each of the respective key values comprise a respective product type, a respective attribute name, and a respective attribute value; and
interpreting, using the natural language model, the one or more attributes of the predetermined set of attributes within the title of the item comprises:
processing each respective title into one or more n-grams; and
searching a nested dictionary using each combination of the one or more n-grams as a search query to locate the one or more attributes in the title of the item.

3. The system of claim 2, wherein the computing instructions are further configured to run on the one or more processors and perform:
building the nested dictionary based on the respective key values, as extracted, for the each respective product type, wherein the nested dictionary comprises attributes of the each respective product type, by:
lemmatizing each respective word in each of the respective attribute values of the key values; and
storing each respective word of the respective attribute values of the key values, as lemmatized, in the nested dictionary database.

4. The system of claim 1, wherein determining the first title quality score for the title further comprises:
assigning the first title quality score for the item based on an aggregated attribute score.

5. The system of claim 1, wherein determining the second title quality score for the title further comprises:
assigning the second title quality score for the item based on a maximum of the respective similarity scores across the respective words in the title.

6. The system of claim 5, wherein neural network model further comprises a word2vec neural network.

7. The system of claim 5, wherein determining the respective similarity score further comprises using a cosine similarity measurement.

8. The system of claim 1, wherein:
the computing instructions are further configured to run on the one or more processors and perform:
determining a third title quality score for the title based on a third rule used to evaluate a length of the title based on the product type; and
determining a fourth title quality score for the title based on a fourth rule used to evaluate an occurrence of prohibited characters within the title based on a predetermined list of prohibited characters; and
determining the aggregated title quality score for the title further comprises:
determining the aggregated title quality score for the title based on additional factors of the third title quality score and the fourth title quality score.

9. The system of claim 1, wherein:
the computing instructions are further configured to run on the one or more processors and perform:
determining a promotional title quality score for the title based on a promotional rule used to evaluate an occurrence of one or more promotional words within the title; and
determining the aggregated title quality score for the title further comprises:
determining the aggregated title quality score for the title based on an additional factor of the promotional title quality score.

10. The system of claim 1, wherein:
the computing instructions are further configured to run on the one or more processors and perform:
determining a title capitalization quality score for the title based on a capitalization rule used to evaluate capitalization of each word in the title; and
determining the aggregated title quality score for the title further comprises:
determining the aggregated title quality score for the title based on an additional factor of the title capitalization quality score.

11. A method being implemented via execution of computing instructions configured to run at one or more processors and stored at one or more non-transitory computer-readable media, the method comprising:
receiving a title of an item associated with an online catalog, wherein:
the item is associated with a product type; and
the product type comprises a predetermined set of attributes;
interpreting, using a natural language model, one or more attributes of the predetermined set of attributes of the product type within the title of the item;
determining a first title quality score for the title based on a first rule used to evaluate key value attributes of the one or more attributes of the title, wherein the first rule comprises a condition for a quantity of key value attributes in the title based on the product type;
determining a second title quality score for the title by:
embedding, using a neural network model, first data of the product type of the item into a first vector;
embedding, using the neural network model, respective second data of each respective word in the title of the item into a respective second vector; and
determining a respective similarity score between the first vector and the respective second vector for the each respective word in the title;
determining an aggregated title quality score for the title based on at least the first title quality score and the second title quality score using a respective predetermined weight assigned to each of (i) the first title quality score and (ii) the second title quality score;
generating a content quality list for the title, wherein the content quality list identifies at least one or more content issues based on the aggregated title quality score for the title; and
sending instructions to display, on a user interface of an electronic device, a content quality dashboard comprising the content quality list for the title of the item, the first title quality score, and the second title quality score.

12. The method of claim 11, further comprising:
pre-processing data for each respective attribute of the predetermined set of attributes of each respective product type in the online catalog; and
extracting respective key values for the each respective product type, wherein each of the respective key values comprise a respective product type, a respective attribute name, and a respective attribute value,
wherein:
interpreting, using the natural language model, the one or more attributes of the predetermined set of attributes within the title of the item comprises:
processing each respective title into one or more n-grams; and
searching a nested dictionary using each combination of the one or more n-grams as a search query to locate the one or more attributes in the title of the item.

13. The method of claim 12, further comprising:
building the nested dictionary based on the respective key values, as extracted, for the each respective product type, wherein the nested dictionary comprises attributes of the each respective product type, by:
lemmatizing each respective word in each of the respective attribute values of the key values; and
storing each respective word of the respective attribute values of the key values, as lemmatized, in the nested dictionary database.

14. The method of claim 11, wherein determining the first title quality score for the title further comprises:
assigning the first title quality score for the item based on an aggregated attribute score.

15. The method of claim 11, wherein:
assigning the second title quality score for the item based on a maximum of the respective similarity scores across the respective words in the title.

16. The method of claim 15, wherein the neural network model further comprises a word2vec neural network.

17. The method of claim 15, wherein determining the respective similarity score further comprises using a cosine similarity measurement.

18. The method of claim 11, further comprising:
determining a third title quality score for the title based on a third rule used to evaluate a length of the title based on the product type; and
determining a fourth title quality score for the title based on a fourth rule used to evaluate an occurrence of prohibited characters within the title based on a predetermined list of prohibited characters,
wherein:
determining the aggregated title quality score for the title further comprises:
determining the aggregated title quality score for the title based on additional factors of the third title quality score and the fourth title quality score.

19. The method of claim 11, further comprising:
determining a promotional title quality score for the title based on a promotional rule used to evaluate an occurrence of one or more promotional words within the title,
wherein:
determining the aggregated title quality score for the title further comprises:
determining the aggregated title quality score for the title based on an additional factor of the promotional title quality score.

20. The method of claim 11, further comprising:
determining a title capitalization quality score for the title based on a capitalization rule used to evaluate capitalization of each word in the title; and
wherein:
determining the aggregated title quality score for the title further comprises:
determining the aggregated title quality score for the title based on an additional factor of the title capitalization quality score.

* * * * *